United States Patent [19]

Bell et al.

[11] Patent Number: 5,000,616

[45] Date of Patent: Mar. 19, 1991

[54] OIL CONTAINMENT BOOM

[75] Inventors: John F. Bell, Plano; Weldon H. Barber, Wylie, Tex.

[73] Assignee: Atlantic Richfield, Los Angeles, Calif.

[21] Appl. No.: 546,812

[22] Filed: Jul. 2, 1990

[51] Int. Cl.⁵ ............................................. E03B 15/06
[52] U.S. Cl. ........................................ 405/66; 405/71
[58] Field of Search ................... 405/63, 64, 65, 66, 405/70, 71, 72; 210/242.3, 923

[56] References Cited

U.S. PATENT DOCUMENTS

| 3,638,430 | 2/1972 | Smith | 405/66 |
| 3,653,213 | 4/1972 | Childers | 405/63 |

FOREIGN PATENT DOCUMENTS

| 2431572 | 3/1980 | France | 405/66 |
| 494989 | 1/1954 | Italy | 405/63 |
| 54003 | 3/1923 | U.S.S.R. | 405/65 |

*Primary Examiner*—David H. Corbin
*Attorney, Agent, or Firm*—F. Lindsey Scott

[57] ABSTRACT

An oil containment boom comprising a plurality of sections of a lighter than water, pliable, closed-cell foam material with each of the sections having a weight positioned along one side so that when the section is placed in the water the section floats with the weighted side beneath the water and the other side of the section above the water and a plurality of couplers for flexibly joining the ends of the sections to encloses an oil containment zone.

7 Claims, 1 Drawing Sheet

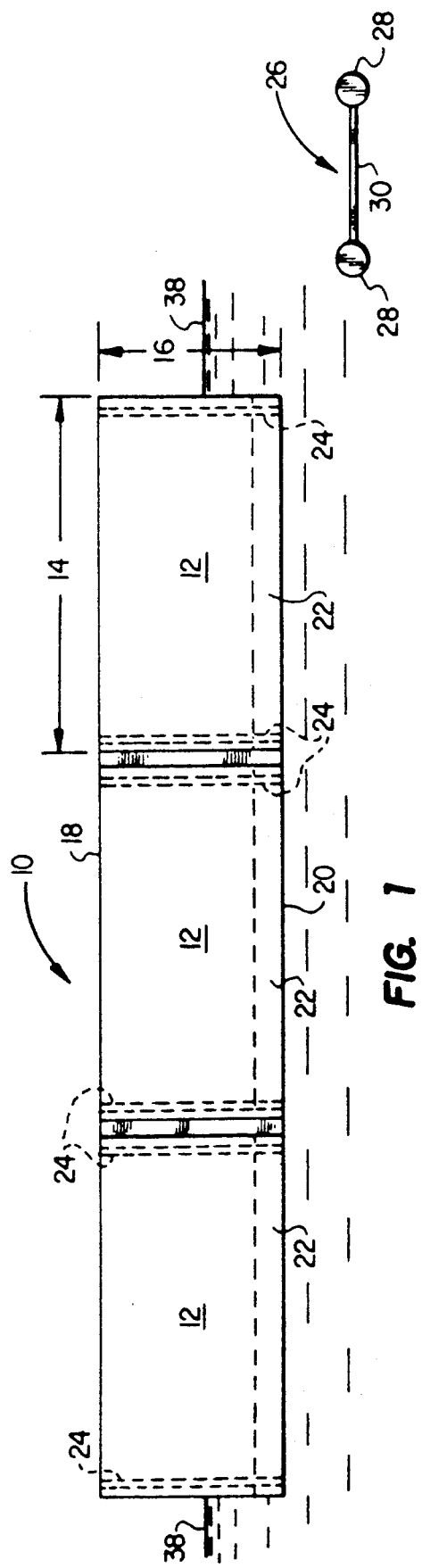
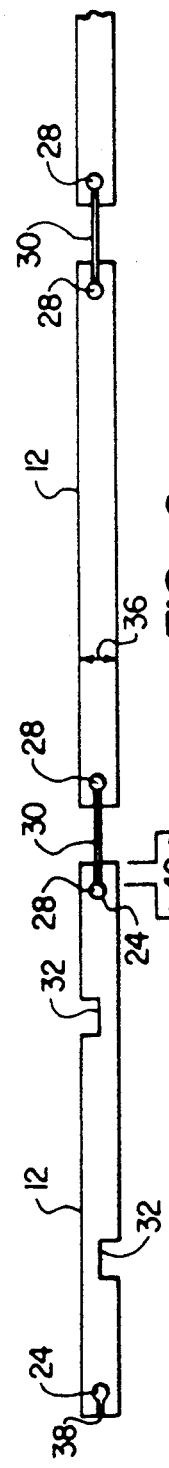
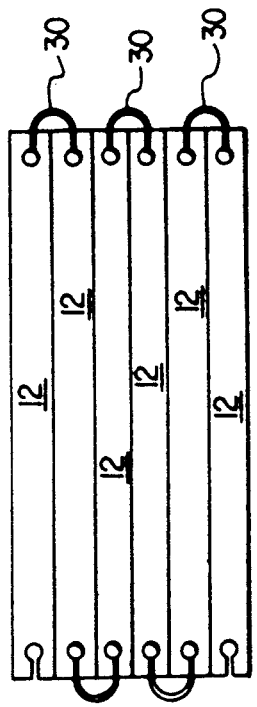
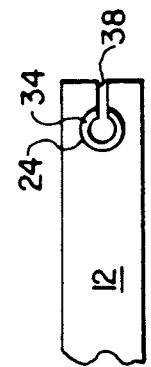

OIL CONTAINMENT BOOM

BACKGROUND OF THE INVENTION

1. Field of the Invention

This invention relates to oil containment booms for containing oil spills in bodies of water.

2. Background of the Invention

A variety of oil containment booms have been previously used to contain oil spills in bodies of water. Many such spills occur in bodies of water such as oceans, lakes and the like where there is substantial wave action which tends to move the oil outside the boom or disperse the oil in the water. Many previous booms have been fabricated of materials which float on the water. Such booms are frequently lifted clear of the water by wave action especially, when the spill is in the ocean or other large bodies of water. In such instances the oil can flow beneath the boom and escape. Frequently, the wave action is sufficient to disperse the oil in the top foot or so of the water so that the oil dispersed in the water easily escapes beneath the boom when a floating boom is used. Further, it is difficult to tow a floating boom while retaining the oil inside the boom.

Since containment of oil spills is of increasing concern, a continuing search has been directed to the development of oil containment booms which more effectively contain oil spills.

SUMMARY OF THE INVENTION

According to the present invention, it has been found that oil spills are contained by an oil containment boom comprising:
(a) a plurality of sections of a lighter than water, pliable, closed cell foam material with each of the sections having a weight positioned along one side so that when the section is placed in water, the section floats with the weighted side beneath the water with the other side of the section above the water; and,
(b) coupling means for flexibly joining the ends of the sections.

BRIEF DESCRIPTION OF THE DRAWINGS

FIG. 1 is a schematic diagram of a side view of an embodiment of the present invention;

FIG. 2 is a schematic diagram of a top view of an embodiment of the present invention;

FIG. 3 is a top view of a coupler for use in joining the sections used in the present invention;

FIG. 4 is an end view of sections as coupled and stacked for storage; and,

FIG. 5 is a top view of an embodiment of a receptacle in one end of one section for receiving a coupling means to join the sections.

In the discussion of the Figures the same numbers will be used throughout to refer to the same or similar components.

DESCRIPTION OF PREFERRED EMBODIMENTS

The FIG. 1 embodiment of the present invention is shown in a body of water having a level 38. The boom 10 comprises a plurality of sections 12 having a width 14 and a height 16. A weight 22 is positioned near the bottom 20 of each of sections 12. As a result, the top 18 of each section floats above the water with the bottom 20 of each section floating beneath the water to form a barrier to the escape of oil for a distance beneath the water. The weight may be fixed to the section, embedded in the section or otherwise joined to the section. The primary requirement is that the weight be positioned on or near the bottom of the section in order to provide the necessary weight to cause the section to float in an upright position in the water. Sections 12 are joined by a plurality of coupling means 26, shown in FIG. 3, each of which consists of two pins 28 joined by a flexible sheet 30. Flexible sheet 30 may be welded or otherwise joined to pins 28. Pins 28 are positioned in holes 24 positioned through at least a substantial portion of and desirably through the height of sections 12 to flexibly couple sections 12. Pins 28 are positioned in holes 24 which are formed of a size slightly smaller than pins 28 so that the pins are retained in position to maintain flexible sheet 30 in position between sections 12 to flexibly join the sections. The top of pins 28 can be flattened or pins 28 can otherwise be restrained in holes 24 as known to those skilled in the art.

In FIG. 2, a top view of an embodiment of the present invention is shown. One section is shown with a pair of reduced thickness zones 32 which may be used as desired to increase the flexibility of sections 12. While not shown, it should be understood that horizontal reduced thickness zones could also be used if it is desirable to so increase the flexibility of sections 12. In FIG. 2, one hole 24 is shown without a pin 28. A cut 38 is formed between hole 24 and the end of section 12. Cut 38 is desirably of a width less than the thickness of flexible sheet 30 so that flexible sheet 30 is tightly gripped by the edges of cut 38. Flexible sheet 30 may be of any suitable thickness consistent with the strength requirements for coupling sections 12. Thicknesses of about ⅛ inch are considered suitable for general applications.

In FIG. 4, a plurality of sections 12 are stacked. Desirably, flexible sheet 30 is of a length between pins 28 suitable to permit stacking of the coupled sections. The length of flexible sheet 30 should be equal to the section thickness 36, as shown in FIG. 2, of sections 12 plus twice the distance from the outer diameter of holes 24 to the end of section 12, shown as the distance 40 in FIG. 2. Desirably, flexible sheet 30 is somewhat longer than this minimum distance to permit ready stackability of the sections.

In FIG. 5, an alternate embodiment for holes 24 is shown wherein a liner 34 is positioned in a hole 24. In a preferred embodiment no liner is used but it may be desirable in some instances to use a liner in holes 24.

Any lighter than water, pliable, closed cell foam which provides suitable strength in the size and thickness selected can be used to form sections 12. A suitable material is pliable polystyrene. This material is relatively strong and is suitable flexibly. A desirable size for sections 12 is a height of about 4 to about 6 feet with a width of about 4 to about 8 feet. It may be found convenient in many instances to use standard 4 foot by 8 foot standard sheets to form sections 12. Suitable section thicknesses are from about 3 to about 4 inches. Preferably, the holes are from about ½ to about 1 inch in diameter and are positioned at least one hole diameter from the ends of sections 12.

Preferably, couplers 30 comprise pins 28 of polyvinyl chloride pipe with flexible sheet 30 comprising flexible poly-ethylene. Other materials having suitable properties could be substituted as known to those skilled in the art for the sections and the coupler components.

In the use of the boom of the present invention the sections can be transported to an area quickly and easily in stacks as shown in FIG. 4 and simply dumped into the water where they unfold as they float in position. The separate stacks can be readily joined by positioning couplers into holes 24 in the ends of sections 12 to form a containment zone of any desired size. Since the boom of the present invention is relatively sturdy, it can be dragged slowly to an area for collection of the oil by placing a rope or the like around the boom and towing the boom with the oil to a desired location.

Since the boom of the present invention extends for a distance beneath the surface it resists the escape of oil which may be entrained in the water and since it extends for a distance above the surface it effectively contains oil on the surface. Since the boom extends beneath the water, it is much less susceptible to being lifted above the water in wave troughs and the like by wave action. Desirably, the boom is submerged to a depth of ⅓ to ⅔ of the height of sections 12.

Having thus described the present invention by reference to certain of its preferred embodiments it is respectfully pointed out that the embodiments discussed are illustrative rather than limiting in nature and that many variations and modifications are possible within the scope of the present invention. Many such variations and modifications may be considered obvious and desirable by those skilled in the art based upon a review of the foregoing description of preferred embodiments.

Having thus described the invention we claim:

1. An oil containment boom comprising:
   (a) a plurality of sections of a lighter-than-water, pliable, closed-cell foam, each of said sections having positioned along one side a weight means to that when said sections are placed in water said sections float with said weighted side beneath said water with the other side of said sections above said water wherein said sections have generally flat sides so that said sections can be stacked; and,
   (b) coupling means comprising two pins joined by a flexible sheet so that when each of said pins is positioned in a hole extending through the height of a section the two sections are coupled by said flexible sheet for flexibly joining the ends of said sections to form an oil containment zone wherein said flexible sheet is of a width between said pins sufficient to permit said sections as coupled to be stacked.

2. The boom of claim 1 wherein said sections are generally rectangular.

3. The boom of claim 1 wherein said sections are square.

4. The boom of claim 1 wherein said sections are submerged to a depth from one-third to two-thirds of the height of said sections.

5. The boom of claim 1 wherein said sections are made of pliable polystyrene.

6. The boom of claim 1 wherein said pins are made of polyvinyl chloride.

7. The boom of claim 1 wherein said flexible sheet is made of flexible polyethylene.

* * * * *